United States Patent
Rosenberg

(10) Patent No.: US 11,130,592 B1
(45) Date of Patent: Sep. 28, 2021

(54) METHOD OF AVOIDING CONTROLLED FLIGHT INTO TERRAIN AND A CONTROLLED FLIGHT INTO TERRAIN AVOIDANCE SYSTEM

(71) Applicant: Nicky Rosenberg, Whitehorse (CA)

(72) Inventor: Nicky Rosenberg, Whitehorse (CA)

( * ) Notice: Subject to any disclaimer, the term of this patent is extended or adjusted under 35 U.S.C. 154(b) by 0 days.

(21) Appl. No.: 17/213,482

(22) Filed: Mar. 26, 2021

(30) Foreign Application Priority Data

Mar. 27, 2020 (CA) .................. CA 3077269

(51) Int. Cl.
| G06F 17/00 | (2019.01) |
| B64D 45/08 | (2006.01) |
| G06F 3/14 | (2006.01) |
| G02B 27/01 | (2006.01) |
| G01S 7/06 | (2006.01) |
| G01S 13/935 | (2020.01) |

(52) U.S. Cl.
CPC .............. B64D 45/08 (2013.01); G01S 7/06 (2013.01); G01S 13/935 (2020.01); G02B 27/0172 (2013.01); G06F 3/14 (2013.01); G02B 2027/0141 (2013.01); G02B 2027/0178 (2013.01)

(58) Field of Classification Search
CPC ....... B64D 45/08; G06F 3/14; G02B 27/0172; G02B 2027/0178; G02B 2027/0141; G01S 7/06; G01S 13/935
USPC ........................................................ 701/3
See application file for complete search history.

(56) References Cited

U.S. PATENT DOCUMENTS

| 5,555,175 A | 9/1996 | D'orso | |
| 8,964,298 B2* | 2/2015 | Haddick | H04N 7/15 359/630 |
| 9,858,824 B1* | 1/2018 | Zogg | H04B 7/18506 |
| 2008/0262664 A1* | 10/2008 | Schnell | G01C 23/00 701/4 |
| 2010/0292871 A1 | 11/2010 | Schultz et al. | |
| 2010/0305784 A1 | 12/2010 | Anderson et al. | |

(Continued)

FOREIGN PATENT DOCUMENTS

DE  10 2017 130 714 A1  6/2019
EP  0 652 544 A1  5/1995

OTHER PUBLICATIONS

Canadian Office Action Corresponding to 3,077,269 dated Jul. 16, 2020.

*Primary Examiner* — Ronnie M Mancho
(74) *Attorney, Agent, or Firm* — Finch & Maloney, PLLC; Michael J. Bujold; Jay S. Franklin

(57) ABSTRACT

A method of avoiding Controlled Flight Into Terrain (CFIT) involves a step of equipping an aircraft with a radar based sensor positioned in an angular orientation directed forward and down, so as to detect ground objects ahead of the aircraft. The radar must have a range of at least 10 Kilometres. A processing unit monitors the radar 5 based sensor. A display remains in an inactive mode until the radar based sensor detects a ground object meeting predetermined parameters. Upon the radar based sensor detecting a ground object the processing unit is programmed to switch the display to the active mode and display a graphic representation of the ground object. The method puts the pilot on alert with an 10 accentuated and focused warning in sufficient time to take appropriate evasive action to avoid a ground obstacle.

6 Claims, 4 Drawing Sheets

(56) References Cited

U.S. PATENT DOCUMENTS

| | | | |
|---|---|---|---|
| 2013/0278631 A1* | 10/2013 | Border | G02C 5/143 |
| | | | 345/633 |
| 2016/0264255 A1 | 9/2016 | Connor et al. | |
| 2016/0272340 A1* | 9/2016 | Leland | B64D 43/02 |
| 2017/0134653 A1* | 5/2017 | Gettings | G08B 13/19695 |
| 2017/0309060 A1 | 10/2017 | John | |
| 2018/0113590 A1* | 4/2018 | Osterhout | G06F 3/03547 |
| 2018/0164404 A1* | 6/2018 | Koga | G06F 1/3287 |
| 2020/0015536 A1* | 1/2020 | Ciccaglione | G01C 21/365 |

* cited by examiner

METHOD OF AVOIDING CONTROLLED FLIGHT INTO TERRAIN AND A CONTROLLED FLIGHT INTO TERRAIN AVOIDANCE SYSTEM

FIELD

The present application relates to a method of avoiding Controlled Flight Into Terrain and a Controlled Flight Into Terrain Avoidance System in accordance with the method.

BACKGROUND

Every year there are airplane crashes occurring which are termed "Controlled Flight Into Terrain" (CFIT) crashes. The airplane literally flies in a controlled manner into a hillside. Most often these CFIT crashes occur under conditions of poor visibility, with the pilot unaware of the imminent danger until it is too late.

There have been a number of patents filed which describe systems intended to avoid CFIT: U.S. Patent publication 20080262664 (Schnell et al) titled "Synthetic vision system and methods"; U.S. Patent publication 20100292871 (Schultz et al) titled "Adaptive Surveillance And Guidance System For Vehicle Collision Avoidance And Interception"; U.S. Patent publication 20100305784 (Anderson et al) titled "Embedded Ground Proximity Warning System for Helicopters"; U.S. Patent publication 20160264255 (Connor et al) titled "Vehicle Navigation Methods, Systems and Computer Program Products"; U.S. Patent publication 20160272340 (Leland et al) titled "Aircraft-Vision Systems And Methods For Maintaining Situational Awareness And Spatial Orientation"; U.S. Patent publication 20170309060 (John) titled "Cockpit Display For Degraded Visual Environment (DVE) Using Millimeter Wave Radar (MMWR)".

The problem of CFIT is particularly acute for aircraft flying under Visual Flight Rules (VFR). Often the only option for aircraft flying under VFR is to fly around a ground obstacle, as there can be a number of reasons why such aircraft may not have the option of pulling up to fly over the ground obstacle. There may be technical limitations which prevent an aircraft from pulling up to fly over a ground obstacle. The aircraft may not have the power for the climb required and may not have a pressurized cabin required for higher altitudes. There may be weather limitations which prevent an aircraft from pulling up to flying over a ground obstacle. For example, there could be low cloud cover, and the aircraft flying under VFR is not allowed to fly above the clouds. It is, therefore, critical that a pilot flying under VFR received warning in sufficient time to take appropriate evasive action to avoid a ground obstacle.

SUMMARY

According to one aspect there is provided a method of avoiding Controlled Flight Into Terrain. The method involves a step of equipping an aircraft with at least one radar based sensor positioned in an angular orientation directed forward and down, so as to detect ground objects ahead of the aircraft. The radar must have a range of at least 10 Kilometres. The method involves a step of positioning a dedicated processing unit within the aircraft. The processing unit is dedicated to receiving signals solely from the at least one radar based sensor. The method involves a step of positioning a dedicated display within the aircraft. The display is in communication with the processing unit and is dedicated to displaying only such graphics generated by the processing unit. The display has an active mode and an inactive mode. The method involves a step of programming the processing unit to monitor the at least one radar based sensor and leave the display in an inactive mode until the at least radar based sensor detects a ground object meeting predetermined parameters. Upon the at least radar based sensor detecting a ground object meeting the predetermined parameters the processing unit being programmed to switch the display to the active mode and display a graphic representation of the ground object.

According to another aspect there is provided a CFIT avoidance system that includes an aircraft with at least one radar based sensor positioned in an angular orientation directed forward and down, so as to detect ground objects ahead of the aircraft. The radar has a range of at least 10 Kilometres. A dedicated processing unit is positioned within the aircraft. The processing unit is dedicated to receiving signals solely from the at least one radar based sensor. A dedicated display is positioned within the aircraft. The display is in communication with the processing unit and is dedicated to displaying only such graphics as generated by the processing unit. The display has an active mode and an inactive mode. The processing unit is programmed to monitor the at least one radar based sensor and leave the display in an inactive mode until the at least radar based sensor detects a ground object meeting predetermined parameters. Upon the at least radar based sensor detecting a ground object meeting the predetermined parameters, the processing unit is programmed to switch the display to the active mode and display a graphic representation of the ground object.

It should be noted that the radar must have a range of at least 10 Kilometres. There is a reason for this. A small airplane, such as a Cessna, flies at approximately 170 Kilometres per hour. Warning of a ground object within 10 Kilometres will give the pilot approximately 3 minute and 30 seconds to take evasive action to avoid the ground object. If the radar has a range of less than 10 Kilometres, the pilot of the small airplane will not have sufficient time to react. It will be appreciated that if a larger and faster airplane was equipped with a CFIT avoidance system, an even greater range would be required. For example, a radar detection system with only a 10 Kilometre range would only afford a 50 second warning of a ground object to a pilot of an airliner travelling at 700 kilometres per hour.

It should be noted that the processing unit is dedicated to receiving signals solely from the at least one radar based sensor. As can be determined from a review of the prior art there are certainly other technologies that have been integrated into such systems and potentially could be integrated into the CFIT system. However, this is considered highly undesirable. One concern is that signal delays waiting for Global Positioning System (GPS) confirmation will create a time delay which will further reduce that relatively short warning that a pilot receives. Another concern is that adjustments to sensor results required when other technologies (such as GPS and terrain maps) are integrated could introduce inaccuracies. This CFIT system was developed for use Northern Canada. In many areas of Northern Canada GPS is not reliable and terrain maps are outdated or non-existent.

It should be noted that the display is left in an inactive mode until the at least radar based sensor detects a ground object meeting predetermined parameters. Upon the at least radar based sensor detecting a ground object meeting the predetermined parameters the processing unit being programmed to switch the display to the active mode. The reason for this is that a display that is always active tends to blend into the other instrumentation. The CFIT avoidance system is a warning system. When it becomes active, the pilot only has approximately 3 minutes and 30 seconds to react. As will be hereinafter described, it is preferred that the display be in the form of "augmented reality glasses", so that the change to active status is immediately brought to the pilots attention and cannot be inadvertently overlooked. If a display other than "augmented reality glasses" were to be used, it would be important to bring the change in status to the attention of the pilot by having an alarm state indication with a flashing light, an auditory tone or a vibrating element.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
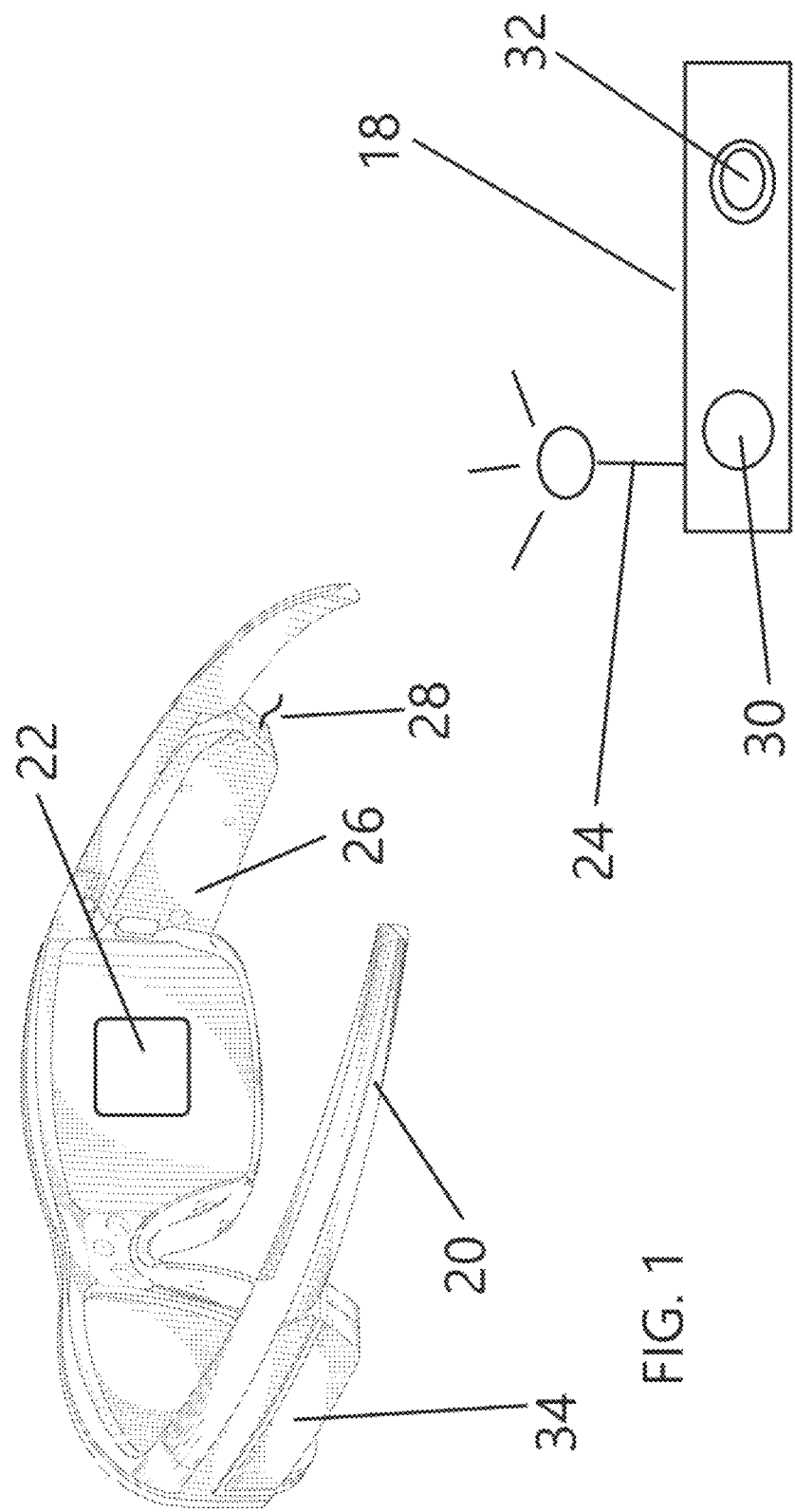
FIG. 1 is a schematic diagram of components of a CFIT avoidance system in accordance with the teachings of the method.

A method of avoiding Controlled Flight Into Terrain (CFIT) and a CFIT Avoidance System, generally identified by reference numeral 10, will now be described with reference to FIG. 1 through FIG. 4.

Figure 2:
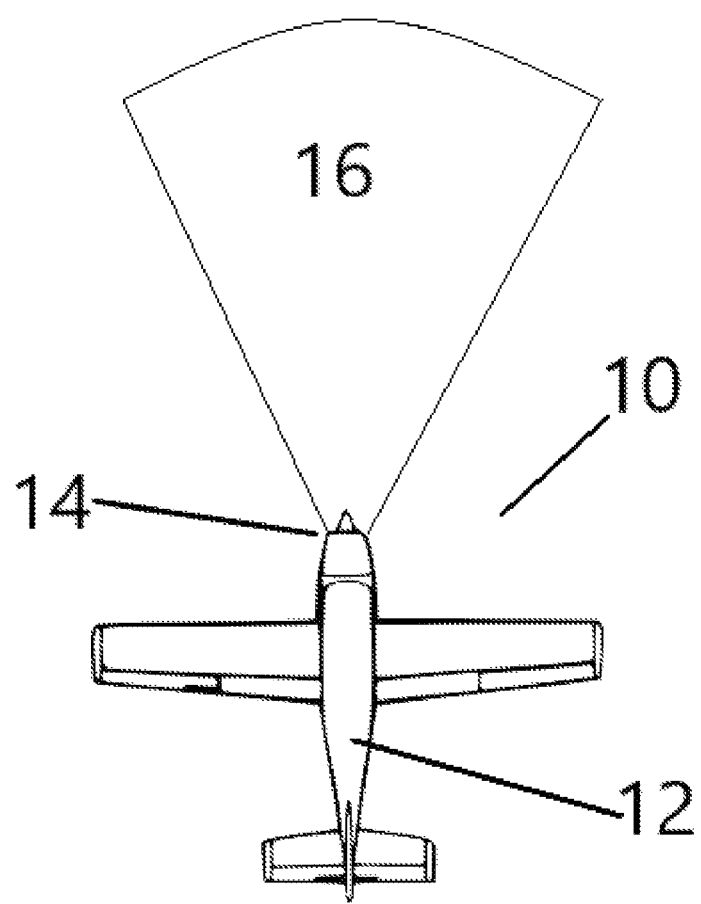
FIG. 2 is a top plan view of an airplane equipped with the CFIT avoidance system of FIG. 1.
Figure 3:
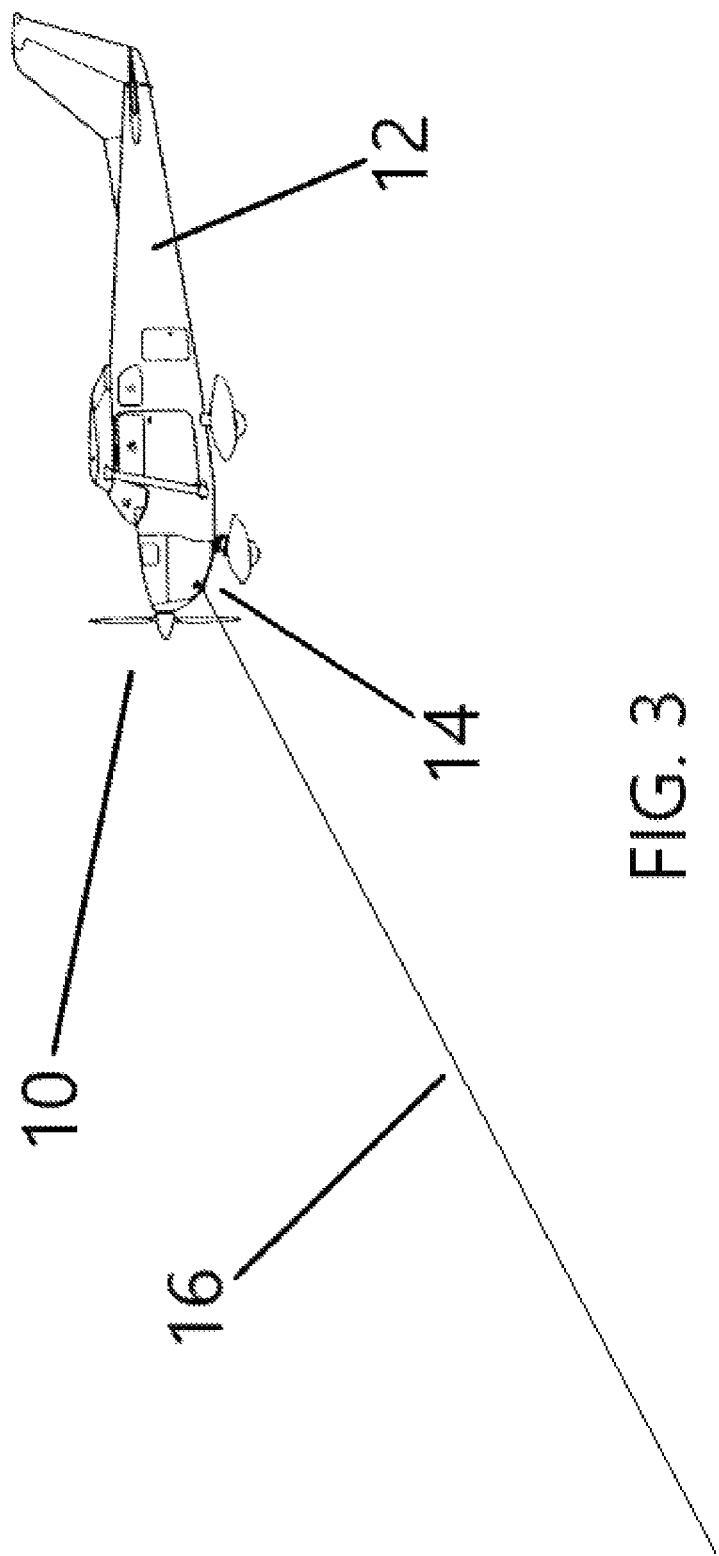
FIG. 3 is a side elevation view of an airplane equipped with the CFIT avoidance system of FIG. 1.

Structure and Relationship of Parts:

Referring to FIG. 2, CFIT avoidance system 10 includes an aircraft 12 with at least one radar based sensor 14 positioned in an angular orientation directed forward and down as shown by reference numeral 15. It will be understood that there may be one of more radar based sensor 14. Hereinafter, there will reference to one radar based sensor, it being understood that they may be more than one to provide the coverage desired. Radar based sensor 14 must have a range of at least 10 Kilometres. The exact range depends upon the cruising speed of aircraft 12 and is intended to allow the pilot of aircraft 12 sufficient time to react. For example, a small airplane, such as a Cessna, flies at approximately 170 Kilometres per hour. Warning of a ground object within 10 Kilometres will give the pilot approximately 3 minute and 30 seconds to take evasive action to avoid the ground object.

Referring to FIG. 1, the other components of CFIT avoidance system 10 are illustrated. There is a dedicated processing unit 18 within aircraft 12. Processing unit 18 is dedicated to receiving signals solely from radar based sensor 14. There is a dedicated display, shown as taking the form of "augmented reality glasses" 20, within aircraft 12. Augmented reality glasses 20 are in communication with processing unit 18 and are dedicated to displaying only such graphics generated by processing unit 18. As will hereinafter described, augmented reality glasses 10 have an active mode and an inactive mode.

Referring to FIG. 1, processing unit 18 is programmed to monitor radar based sensor 14 (shown in FIG. 2 and FIG. 3) and leave the augmented reality glasses 20 in an inactive mode until radar based sensor 14 (shown in FIG. 2 and FIG. 3) detects a ground object meeting predetermined parameters. Upon radar based sensor 14 (shown in FIG. 2 and FIG. 3) detecting a ground object meeting the predetermined parameters, processing unit 18 is programmed to switch augmented reality glasses 20 to the active mode and display a graphic representation of the ground object.

Referring to FIG. 1, display area 22 of augmented reality glasses 20 remains transparent when in the inactive mode. The only indication that the user will have in the inactive mode will be a small indicator light providing confirmation that augmented reality glasses are operational. However, when augmented reality glasses 20 are in the active mode, a graphic representation of the ground object detected will be displayed in display area 22. It is preferred that processing unit 18 have a wireless transmitter 24 for the purpose of communicating with augmented reality glasses 20. Augmented reality glasses 20 have a wireless receiver 26 and an associated antenna 28.

In order to ensure that an alarm condition is not inadvertently overlooked by the pilot, processing unit 18 there are additional features that may incorporated into processing unit 18 or connected to processing unit 18. These features will collectively be referred to as the "alarm". It will be understood that any one of all of the features may be included. The alarm includes a flashing light 30 to provide a visual signal, a tone emitter/speaker 32 to provide an auditory signal and a vibrator 34 (attached to augmented reality glasses 20) to provide a tactile sensory signal. As described above with augmented reality glasses 20, the components of alarm have an active mode and an inactive mode. Processing unit 18 is programmed to monitor radar based sensor 14 (shown in FIG. 2 and FIG. 3) and leave the alarm in an inactive mode until the at least radar based sensor detects a ground object meeting predetermined parameters. Upon radar based sensor (shown in FIG. 2 and FIG. 3) detecting a ground object meeting the predetermined parameters, processing unit 18 switches the alarm to the active mode, whereupon flashing light 30 flashes to provide a visual signal, tone emitter/speaker 32 emits a tone to provide an auditory signal and vibrator 34 (attached to augmented reality glasses 20) causes augmented reality glasses 20 to vibrate providing a tactile sensory signal.

Operation:

Referring to FIG. 2, radar based sensor 14 performs a sensing function during the flight of aircraft 12. During normal flight there will not be any ground objects within area 15 that defines the area that radar based sensor 14 covers. That means that during normal flight augmented reality glasses 20 will remain in the inactive mode and display area 22 of augmented reality glasses 20 will remain transparent. That also means that the various alarm features will remain inactive.

Referring to FIG. 2, a change in the weather may create a low cloud cover. This may force a pilot flying under Visual Flight Rules (VFR) to fly lower to the ground than normal, relying upon CFIT system 10. Should a ground object be sensed by radar based sensor 14 within area 15, processing unit 18 immediately switches augmented reality glasses 20 to the active mode and displays a graphic representation of the ground object detected in display area 22 of augmented reality glasses 20. Concurrently, processing unit 18 switches the alarm features to the active mode, causing flashing light 30 to flash to provide a visual signal, tone emitter/speaker 32 to emit a tone to provide an auditory signal and vibrator 34 (attached to augmented reality glasses 20) to cause augmented reality glasses 20 to vibrate providing a tactile sensory signal.

Figure 4:
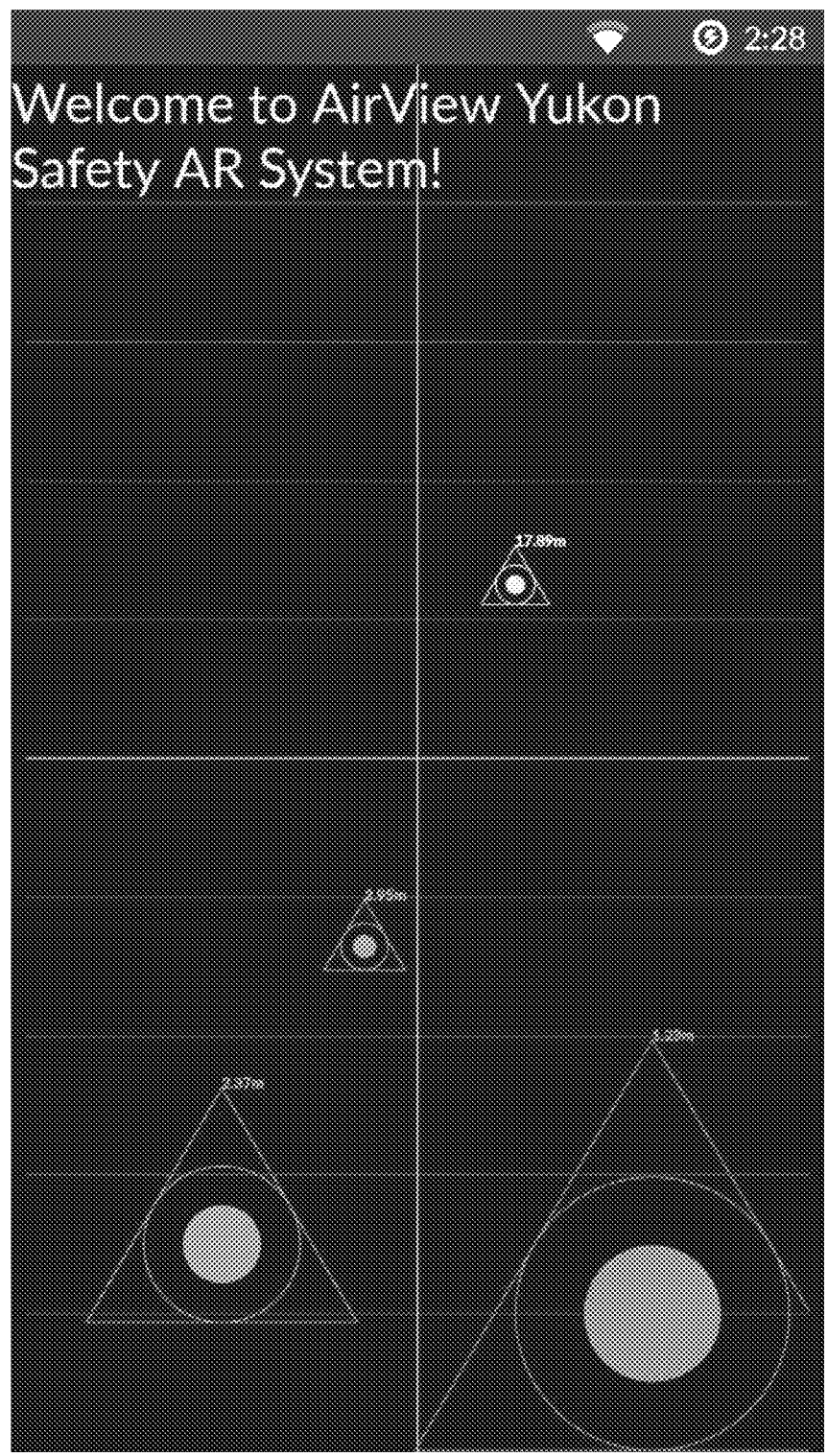
FIG. 4 is a graphic representation of an active display.

Referring to FIG. 4, there is illustrated an example of what display area 22 of augmented reality glasses 20 might look like when switched by processing unit 18 to "active" mode. There are some points to be noted about this active version of display area 22. The background is transparent on augmented reality glasses 20. The dark background in FIG. 4, is intended to represent the transparent background on augmented reality glasses 20. It is important that the background not be a blockage of pilot's vision. The image should be consider as "augmented" reality. "Augmented" reality is a technology that superimposes a computer-generated image on a user's view of the real world through glasses 20, thus providing a composite view. Grid lines are provided for horizontal and vertical reference. The horizontal grid line represents the horizon of aircraft 12. Each ground obstacle is displayed by a full circle, surrounded by a thin circle line and a triangle (symbol of warning or a mountain). The size of the circles and triangles is proportional to the size of the ground obstacle (as determined by the signal strength received by the radar). The location on the display of the ground obstacles are in the same direction as the pilot is looking over the front aircraft window (but can't see them because of fog/night or other obstructions). This makes this type of display very intuitive. Attached to the top corner of the triangle there is a number which represents the distance to the ground object. This can be expressed in miles with the notation "mi" (in the example "m" has been used) or Kilometres with the notation "Km" or any other units, as long as there is a notation to confirm units so as to avoid any confusion. One can also colour code the ground obstacles, with the colour indicating the danger level.

Cautionary Warnings:

It is to be noted that the range of the radar must be matched to suit the speed of aircraft 12. Radar with a range of 10 kilometres will provide a pilot of a small aircraft travelling at 170 kilometres per hour approximately three minutes and 30 seconds to react. When aircraft 12 has a faster cruising speed, the range of the radar must be increased to provide sufficient time to take evasive action. An aircraft that has a pressurized cabin and can climb over ground objects may not need as much time as an aircraft operating under VFR that must change course to go around the ground object.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of avoiding Controlled Flight Into Terrain, comprising:
   equipping an aircraft with at least one radar based sensor positioned in an angular orientation directed forward and down, so as to detect ground objects ahead of the aircraft, the radar having a range of at least 10 kilometers;
   positioning a dedicated processing unit within the aircraft, the processing unit being dedicated to receiving signals solely from the at least one radar based sensor;
   positioning a dedicated display within the aircraft, the display being in communication with the processing unit and being dedicated to displaying only such graphics generated by the processing unit, the display having an active mode and an inactive mode, when in the active mode a graphic representation is displayed and when in the inactive mode there is an indication that the display is operational but no graphic representation is displayed;
   programming the processing unit to monitor the at least one radar based sensor and leave the display in an inactive mode until the at least one radar based sensor detects a ground object of the detected ground objects meeting predetermined parameters, upon the at least one radar based sensor detecting the ground object of the detected ground objects meeting the predetermined parameters the processing unit being programmed to switch the display to the active mode and display a graphic representation of the ground object of the detected ground objects.

2. The method of claim 1, wherein the display is configured as augmented reality glasses, the augmented reality glasses being transparent when the display is in the inactive mode and the augmented reality glasses displaying a graphic representation of the ground object of the detected ground objects detected when the display is in the active mode.

3. The method of claim 1, wherein an alarm is positioned in the aircraft, the alarm being in communication with the processing unit, the alarm having an active mode and an inactive mode, the processing unit being programmed to monitor the at least one radar based sensor and leave the alarm in an inactive mode until the at least one radar based sensor detects a ground object of the detected ground objects meeting predetermined parameters, upon the at least one radar based sensor detecting the ground object of the detected ground objects meeting the predetermined parameters the processing units switching the alarm to the active mode, whereupon the alarm emits at least one of a visual, auditory or vibratory signal.

4. A Controlled Flight Into Terrain Avoidance System, comprising:
   an aircraft with at least one radar based sensor positioned in an angular orientation directed forward and down, so as to detect ground objects ahead of the aircraft, the radar having a range of at least 10 kilometers;
   a dedicated processing unit within the aircraft, the processing unit being dedicated to receiving signals solely from the at least one radar based sensor;
   a dedicated display within the aircraft, the display being in communication with the processing unit and being dedicated to displaying only such graphics generated by the processing unit, the display having an active mode and an inactive mode, when in the active mode a graphic representation is displayed and when in the inactive mode there is an indication that the display is operational but no graphic representation is displayed;
   the processing unit being programmed to monitor the at least one radar based sensor and leave the display in an inactive mode until the at least one radar based sensor detects a ground object of the detected ground objects meeting predetermined parameters, upon the at least one radar based sensor detecting the ground object of the detected ground objects meeting the predetermined parameters the processing unit being programmed to switch the display to the active mode and display a graphic representation of the ground object of the detected ground objects.

5. The system of claim 4, wherein the display is configured as augmented reality glasses, the augmented reality glasses being transparent when the display is in the inactive mode and the augmented reality glasses displaying a graphic representation of the ground object of the detected ground objects detected when the display is in the active mode.

6. The system of claim 4, wherein an alarm is positioned in the aircraft, the alarm being in communication with the processing unit, the alarm having an active mode and an inactive mode, the processing unit being programmed to monitor the at least one radar based sensor and leave the alarm in an inactive mode until the at least one radar based sensor detects the ground object of the detected ground objects meeting predetermined parameters, upon the at least one radar based sensor detecting the ground object of the detected ground objects meeting the predetermined parameters the processing units switching the alarm to the active mode, whereupon the alarm emits at least one of a visual, auditory or vibratory signal.

* * * * *